US010065167B2

United States Patent
Kozyuk

(10) Patent No.: US 10,065,167 B2
(45) Date of Patent: *Sep. 4, 2018

(54) ROTOR AND CHANNEL ELEMENT APPARATUS WITH LOCAL CONSTRICTIONS FOR CONDUCTING SONOCHEMICAL REACTIONS WITH CAVITATION AND METHODS FOR USING THE SAME

(71) Applicant: ARISDYNE SYSTEMS, INC., Cleveland, OH (US)

(72) Inventor: Oleg Kozyuk, North Ridgeville, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/200,874

(22) Filed: Jul. 1, 2016

(65) Prior Publication Data

US 2017/0007976 A1     Jan. 12, 2017

Related U.S. Application Data

(60) Provisional application No. 62/189,932, filed on Jul. 8, 2015.

(51) Int. Cl.
*B01F 7/02*     (2006.01)
*B01J 19/00*     (2006.01)
(Continued)

(52) U.S. Cl.
CPC .............. *B01J 19/008* (2013.01); *B01F 7/008* (2013.01); *B01F 7/00816* (2013.01); *B01J 19/10* (2013.01); *B01J 2219/0877* (2013.01)

(58) Field of Classification Search
CPC .... B01F 7/0075; B01F 7/008; B01F 7/00808; B01F 7/00816; B01F 7/00833;
(Continued)

(56) References Cited

U.S. PATENT DOCUMENTS 3,194,540 A * 7/1965 Hager ...................... A01J 11/16
241/259.1
5,937,906 A     8/1999 Kozyuk
(Continued)

FOREIGN PATENT DOCUMENTS

| RU | 49608 U1 | 11/2005 | |
|---|---|---|---|
| RU | 2305073 C9 | 12/2007 | |
| SU | 1537546 A1 * | 1/1990 | ......... B01F 7/00191 |

OTHER PUBLICATIONS

The International Search Report and Written Opinion issued in corresponding International PCT Application No. PCT/US2016/040782; dated Nov. 24, 2016.
(Continued)

*Primary Examiner* — Charles E Cooley
(74) *Attorney, Agent, or Firm* — Pearne & Gordon LLP

(57) ABSTRACT

A method and device for processing a liquid with cavitation uses a channel element with passageways having local constrictions and a moving rotor surrounding the channel element. The rotor contains a plurality of rotor channels that are moved during rotation to periodically line up with the passageways in the channel element. To operate the device, liquid is passed through the local constriction in the passageway into an outlet channel at a velocity of at least 1.4 m/s at the exit of the outlet channel to form cavitation bubbles. Cavitation bubbles in the liquid in the outlet channel are collapsed by subjecting the cavitation bubbles to a water hammer hydraulic pulse pressure resulting from periodically rapidly closing of the outlet channel by rotation of the rotor.

16 Claims, 3 Drawing Sheets

(51) Int. Cl.
*B01J 19/10* (2006.01)
*B01F 7/00* (2006.01)

(58) Field of Classification Search
CPC .......... B01F 7/00358; B01F 2215/0431; B01J 19/008; B01J 19/10; B01J 2219/0877
USPC ................................ 366/264, 302, 304, 305
See application file for complete search history.

(56) References Cited

U.S. PATENT DOCUMENTS

| | | | |
|---|---|---|---|
| 6,012,492 A | 1/2000 | Kozyuk | |
| 6,035,897 A | 3/2000 | Kozyuk | |
| 6,857,774 B2* | 2/2005 | Kozyuk | B01F 3/0807 366/263 |
| 7,178,975 B2* | 2/2007 | Kozyuk | B01F 5/0057 366/165.4 |
| 7,316,501 B2* | 1/2008 | Thoma | B01F 3/04531 366/168.1 |
| 7,318,553 B2* | 1/2008 | Thoma | F22B 3/06 123/142.5 R |
| 7,357,566 B2* | 4/2008 | Kozyuk | B01F 5/0057 366/165.4 |
| 7,387,262 B2* | 6/2008 | Thoma | F24J 3/003 123/142.5 R |
| 7,507,014 B1* | 3/2009 | League | B01F 7/00816 366/172.1 |
| 9,776,159 B2* | 10/2017 | Kozyuk | B01J 19/008 |
| 9,915,361 B2* | 3/2018 | Mitton | F16K 11/085 |
| 2003/0147302 A1* | 8/2003 | Uesugi | B01F 3/0807 366/164.6 |
| 2004/0022122 A1* | 2/2004 | Kozyuk | B01F 3/0807 366/262 |
| 2005/0150618 A1* | 7/2005 | Kazem | B01F 7/00816 162/50 |
| 2005/0237855 A1* | 10/2005 | Kozyuk | B01F 5/0057 366/304 |
| 2010/0103768 A1 | 4/2010 | Gordon et al. | |
| 2016/0175791 A1* | 6/2016 | Kozyuk | B01F 7/00816 366/118 |
| 2016/0312099 A1* | 10/2016 | Armstead | B01J 8/10 |
| 2016/0325255 A1* | 11/2016 | Parker | B01J 8/16 |
| 2017/0007976 A1* | 1/2017 | Kozyuk | B01J 19/008 |
| 2017/0028375 A1* | 2/2017 | Kozyuk | B01J 19/008 |

OTHER PUBLICATIONS

Pandit, A. B., Moholkar, V. S., "Harness Cavitation to Improve Processing," Chemical Engineering Progress, Jul. 1996, pp. 57-69.

\* cited by examiner

ROTOR AND CHANNEL ELEMENT APPARATUS WITH LOCAL CONSTRICTIONS FOR CONDUCTING SONOCHEMICAL REACTIONS WITH CAVITATION AND METHODS FOR USING THE SAME

FIELD OF THE INVENTION

This invention pertains to the art of methods for conducting sonochemical reactions and processes in aqueous and non-aqueous liquid media, particularly for large scale volumes, and more specifically to methods utilizing hydrodynamic cavitation effects for conducting the sonochemical reactions and processes in liquid utilizing ultra-high energy from the collapse of cavitation bubbles. More specifically, the present invention relates to reactions and methods which are effective and useful in the fields of chemistry, electronic materials, biochemistry, water treatment, food, agriculture, medication, and the pharmaceutical industry.

BACKGROUND

Sonochemistry is the application of ultrasound to chemical reactions and processes. The mechanism causing sonochemical effects in liquids is the phenomenon of ultrasonic cavitation. Up to the present time, it is well known that there are many chemical reactions that essentially alter the speed and yield of finished products under the influence of ultrasonic cavitation.

There also exists a great number of chemical reactions that may only proceed under the influence of ultrasonic cavitation. Similar reactions may be accomplished in aqueous as well as non-aqueous, liquid-based media. The main requirement for the realization of similar reactions is the imposition of ultrasonic cavitation on the liquid medium.

Most of the chemical interaction occurs in the cavitation bubble collapse when there is significant compression and heating of the vapor and gas (Timothy J. Mason, "Advances in Sonochemistry", Volume 3 1993, 292 pp., JAI Press Inc). As the bubble accelerates through the collapse, no heat is lost through the bubble interface in the final collapse stage. Though no heat is lost with respect to the amount stored (adiabatic process), there is vigorous heat flux for a brief instant and a thin thermal boundary layer forms near the bubble interface.

Experimental results have shown that these bubbles have temperatures around 5000 K, pressures of roughly 1000 atm, and heating and cooling rates above $10^{10}$ K is (K. S. Suslick, Science, Vol. 247, 23 Mar. 1990, pgs. 1439-1445). These high temperatures and pressures can create extreme physical and chemical conditions in otherwise cold liquids.

The following sonochemical effects can be observed in chemical reactions and processes: increase in reaction output and speed, changing of reaction pathway and increase in the reactivity of reagents or catalysts, improvement of phase transfer and activation catalysts, avoidance of catalysts and breakage of molecular bonds, improvement of particle and droplets formation and synthesis.

Common for all sonochemical reactions and processes is that, for the creation of cavitation bubbles in a liquid-based medium, the principle of application of ultrasonic oscillations on the liquid-based medium is used. The basic equipment which is used in sonochemistry appears as ultrasonic devices of various designs.

This method of conducting sonochemical reactions is sufficiently effective for processing small volumes of liquids and has found its chief application on the level of laboratory research. Transitioning to large scale volumes, however, which are used in industry, is significantly difficult and even at times impossible. This is associated with the problems which arise during the scaling up of cavitation that is produced with the aid of ultrasonic oscillations.

It is possible to avoid these shortcomings, however, by producing or improving the quality of the initiator of sonochemical reactions, cavitation bubbles, through the course of hydrodynamics. An example of using hydrodynamic cavitation for conducting sonochemical reactions is presented in the work of: Pandit A. B., Moholkar V. S., "Harness Cavitation to Improve Processing," Chemical Engineering Progress, July 1996, pgs. 57-69.

A method disclosed in U.S. Pat. Nos. 5,937,906; 6,012,492; 6,035,897, for conducting sonochemical reactions and processes using large scale liquid medium volumes involves passing a hydrodynamic liquid flow at a velocity through a flow through channel internally containing at least one element to produce a local constriction of the hydrodynamic liquid flow. The velocity of the liquid flow in the local constriction is at least 16 m/sec. A hydrodynamic cavitation cavern is created downstream of the local constriction, thereby generating cavitation bubbles. The cavitation bubbles are shifted with the liquid flow to an outlet from the flow through channel and the static pressure of the liquid flow is increased to at least 12 psi. The cavitation bubbles are then collapsed in the elevated static pressure zone, thereby initiating the sonochemical reactions and processes.

The existing methods are not sufficient to generate significant compression energy release during bubble collapse.

The compression of the bubbles during cavitation in the disclosed patents under static pressure $P_{st}$ increased in the liquid flow. Increasing static pressure of the liquid flow is a linear process and $P_{st}$ cannot be higher than 0.3 P (to avoid cavitation suppression), wherein P is the static pressure before the local constriction where a hydrodynamic liquid flow is passed through a flow-through local constriction; $P_{st}$ is the static pressure downstream of the local constriction. In most cases, cavitation bubble collapse occurs when static pressure surrounding the bubble equals $P_{st}=(0.05$-$0.1)$ P.

There are different approaches to account for the shockwave produced from the collapse of a cavitation bubble. An approximate relationship for the pressure peak amplitude, $P_p$, given by Brennan is $$P_p = 100R\, P_{in}/r, \qquad [1]$$

where R is the maximum bubble radius, r is the distance from the bubble, and $P_{in}$, is the external pressure surrounding the bubble which initiated cavitation bubble collapse ($P_{in}=P_{st}$). (C. E. Brennan. Cavitation and Bubble Dynamics. Oxford University: New York, 1995.) Assuming adiabatic bubble collapse, maximum temperature inside a collapsing bubble can be calculated by:

$$T_{max} = T_0\left(\frac{P_{in}}{P_v}\right)^{(\gamma-1)/\gamma}, \qquad [2]$$

where $T_0$ is the liquid temperature, $P_{in}$ is the external pressure surrounding the bubble which initiated cavitation bubble collapse ($P_{in}=P_{st}$), $\gamma$ is the ratio of specific heats of gas or vapor inside the cavitation bubble before collapse, indicating how much heat is released from the gas during the adiabatic compression and $P_v$ is the gas or vapor pressure inside the cavitation bubble before collapse.

Thus, utilization of the recovering static pressure $P_{st}$ in the liquid as external pressure which initiated cavitation bubble collapse cannot generate high pressure the shockwave and temperature from cavitation bubble collapse and leads to a low intensity of sonochemical reactions and decrease the degree of heating the medium.

Accordingly, there is a continuing need for alternative methods of realizing sonochemical reactions which can provide more effective utilization of the energy of the hydrodynamic flow. The present invention contemplates a new and improved method for conducting sonochemical reactions and processes that makes use of hydrodynamic cavitation for generation of controlled shockwave pressure and temperature conditions in liquids and carries out an ultrafine crush treatment for liquid materials, or achieves effective chemical reactions of liquid materials.

SUMMARY OF THE INVENTION

A method of processing a liquid, such as with conducting a sonochemical reaction or process, the method comprising the steps of:
(a) passing a flow of the liquid from an inlet channel through at least one local constriction and into an outlet channel, the flow of liquid having a velocity of at least 1.4 m/s at the exit end of the outlet channel;
(b) creating at least one liquid jet containing cavitation bubbles beyond the local constriction in the outlet channel; and
(c) collapsing the cavitation bubbles by subjecting the cavitation bubbles to a water hammer hydraulic pulse pressure, said water hammer hydraulic pulse pressure resulting from periodically closing the outlet channel, each said closing of the outlet channel occurring within a time period calculated using the equation: $t \leq 2\ L/c$, where t is the time period in seconds that it takes to close the outlet channel, L is the length of the outlet channel in meters, and c is the speed of sound in said liquid in meters per second.

A device for processing a liquid comprising a housing, a channel element and a rotor, the channel element being mounted in the housing, the channel element having a cylindrical external surface, a longitudinal axis and a plurality of passageways, each passageway extending radially along a line which (a) originates at a point (P) on the longitudinal axis and (b) extends perpendicular to the longitudinal axis, each passageway comprising a local constriction and an outlet channel, the rotor being mounted on a shaft and being located within the housing, the rotor having a cylindrical internal surface facing the channel element cylindrical external surface, the rotor having a plurality of radially extending rotor channels, the rotor being rotatable about the channel element such that, as the rotor rotates, each rotor channel will periodically line up with each outlet channel so that the outlet channel is open.

DETAILED DESCRIPTION OF PREFERRED EMBODIMENTS OF THE INVENTION

Figure 1:
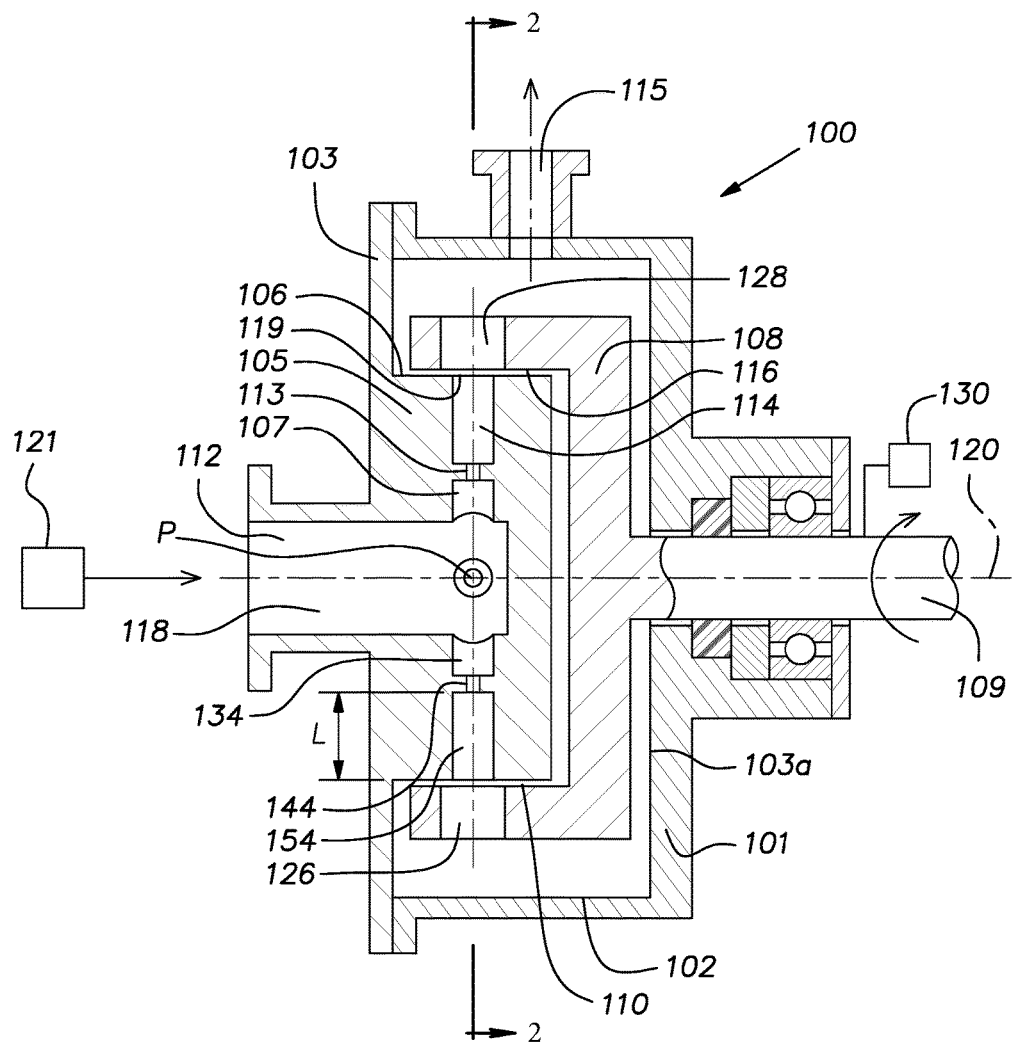
FIG. 1 is a longitudinal cross-sectional view of a device according to the invention that can be used for conducting sonochemical reactions and processes.

Herein, when a range, such as 5-25 (or 5 to 25) is given, this means preferably at least 5 and, separately and independently, preferably not more than 25.

Referring now to the drawings, which are for purposes of illustrating embodiments of the invention only and not for purposes of limiting the same.

Figure 2:
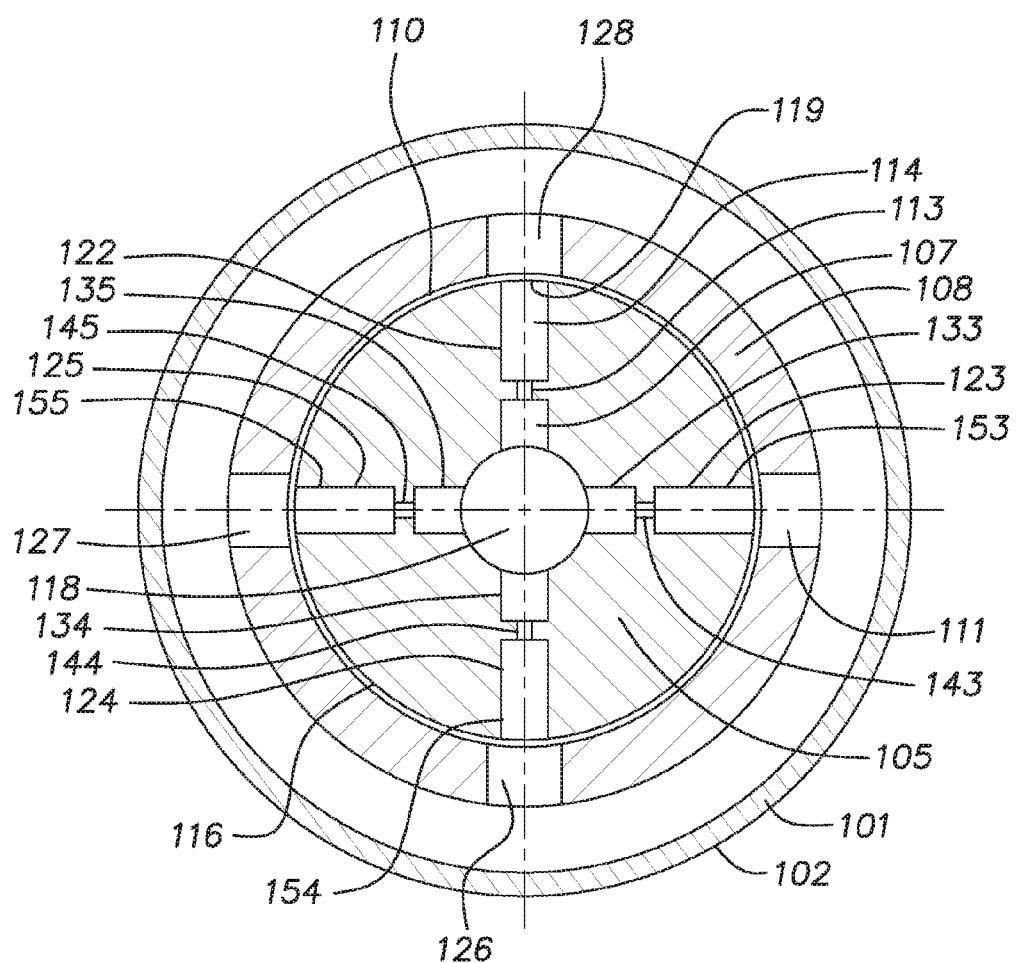
FIG. 2 is a cross-sectional view of the device shown in FIG. 1, taken along the plane defined by line 2-2 in FIG. 1.

FIGS. 1 and 2 show one embodiment of a device 100 for conducting sonochemical reactions and processes in liquid. The device 100 can include a housing 101 defined by a cylindrical housing wall 102 having a longitudinal axis 120, and pair of flat or substantially flat end walls 103, 103*a*.

As shown, cylindrical stationary channel element 105 has a longitudinal axis 120 and is mounted in the housing 101 and is mounted on or extends from the end wall 103 and has a cylindrical external surface 106 facing outwardly toward said housing wall 102.

The housing 101 and the channel element 105 define a chamber 118 having an inlet port 112; pump 121 supplies liquid to inlet port 112 and chamber 118 under pressure.

The channel element 105 has a plurality of passageways 122, 123, 124, 125 which communicate with chamber 118. As shown, each passageway extends radially along a line which (a) originates at central point P on the longitudinal axis 120 and (b) extends perpendicular to the longitudinal axis 120. Four passageways are shown, but there can alternatively be 2, 3, 5, 6, 7, 8, 9, 10, 11, 12 or more passageways, preferably spaced symmetrically around the channel element 105 as shown. Passageway 122 comprises a chamber channel or inlet channel 107, a local constriction 113 and an outlet channel 114. In a corresponding manner, passageways 123, 124, 125 comprise chamber channels or inlet channels 133, 134, 135 respectively, local constrictions 143, 144, 145 respectively, and outlet channels 153, 154, 155 respectively. Alternatively, instead of one local constriction, there can be 2, 3, 4 or more local constrictions arranged in series. Each local constriction can be an orifice, a nozzle, an aperture or an element having an interior or internal cylindrical surface as shown. Inlet port 112 and/or chamber 118 can also function as an inlet channel for passing a flow of liquid through a local constriction.

Each chamber channel, each local constriction, and each outlet channel is preferably cylindrical, i.e., circular in cross section, but can be rectangular or any other shape in cross-section. As shown in the drawings, the chamber channel 107, the local constriction 113 and the outlet channel 114 are aligned such that the passageway 122 has a longitudinal axis which defines the longitudinal axes of the chamber channel 107, the local constriction 113 and the outlet channel 114. The elements of each of the other passageways are aligned in the same way on a common longitudinal axis.

The longitudinal axis of each passageway 122, 123, 124, 125 extends out radially from central point P. The lateral cross sectional area of chamber channel 107 is preferably the same as the lateral cross sectional area of outlet channel 114. The other passageways are proportioned the same.

As shown, rotor 108 is located within the housing 101 and is mounted on shaft 109 extending within the housing 101 and has a cylindrical internal surface 110 facing the external surface 106. The shaft 109 is connected to a motive means 130, such as a motor, effective to rotate the rotor 108. The gap 116 between internal surface 110 and external surface 106 is preferably substantially uniform around the channel element 105 and is preferably 10-1000, 10-500, 10-300, 10-200 or 10-100, microns.

For each passageway 122, 123, 124, 125, a corresponding radially-extending rotor channel 111, 126, 127, 128 is provided in rotor 108 such that rotor 108 can rotate to a position where each longitudinal axis of each rotor channel coincides with the longitudinal axis of its corresponding passageway and its corresponding outlet channel. As shown in FIGS. 1 and 2, when rotor 108 is rotated relative to channel element 105, each rotor channel will periodically line up with each of the outlet channels so that the outlet channel is open.

Each outlet channel 114, 153, 154, 155 has an exit end; the exit end of outlet channel 114 is shown at 119. In FIGS. 3-7, there are shown exit ends 119A, 119B, 119C, 119D and 119E.

Figure 3:
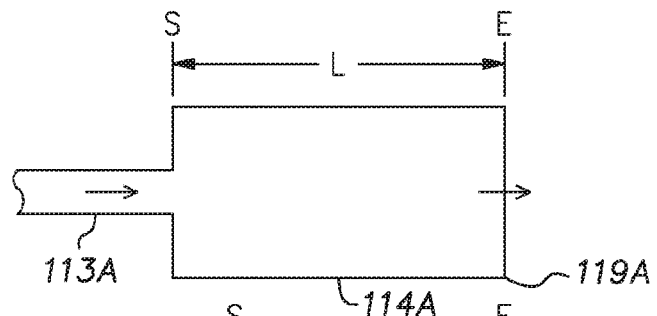
FIG. 3 is a schematic cross sectional view of an embodiment of a local constriction and outlet channel according to the invention.
Figure 4:
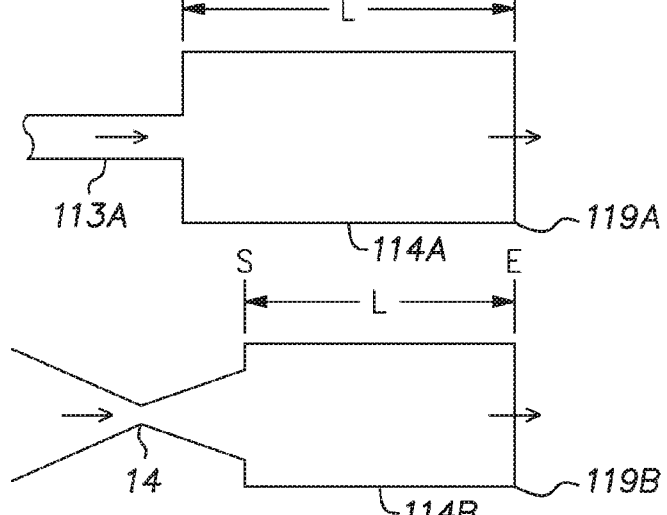
FIGS. 4-7 are schematic cross sectional views of alternative embodiments of a local constriction and outlet channel according to the invention.
Figure 5:
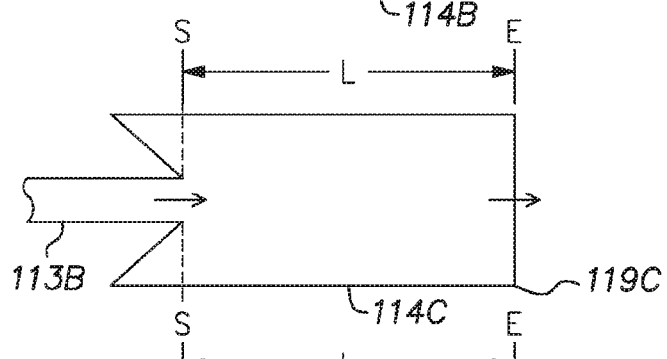
Figure 6:
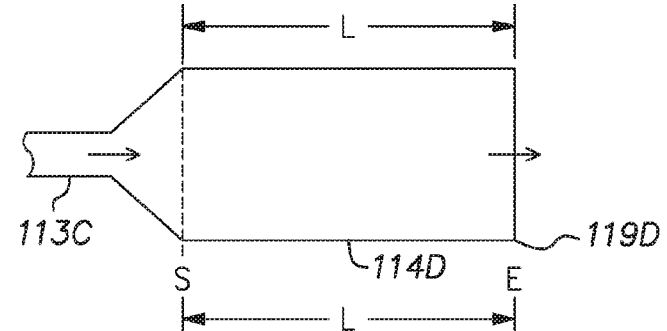
Figure 7:
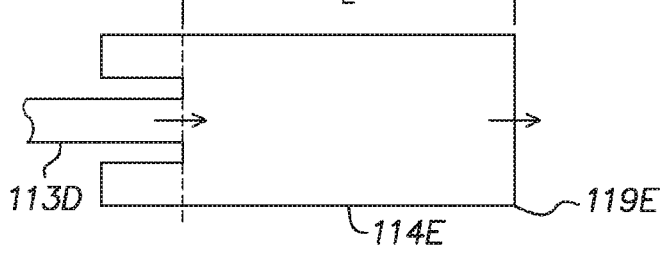

FIG. 3 shows an example of a portion of a passageway such as passageways 122-125, the portion showing a local constriction 113A and an outlet channel 114A. The cross sectional area of the local constriction is measured where it is narrowest or smallest, such as at 14 in FIG. 4. The local constriction is preferably cylindrical with a diameter of 0.1-100, 0.2-70, 0.3-40, 0.5-20, 1-10, mm. When the local constriction is a tube of uniform cross section, the cross sectional area is the lateral cross sectional area of the tube.

The outlet channel 114A is preferably cylindrical. As used herein and in the claims, the outlet channel has a length L; the cross sectional area of the outlet channel is substantially uniform throughout the length L; the length L is measured longitudinally from a starting point S to an exit end E (such as 119, 119A-119E). The exit end E is where the liquid exits the outlet channel. The starting point S is (a) the local constriction (if the local constriction is a single location, such as location 14) or the downstream end of the local constriction (if the local constriction is a tube of uniform cross section, such as a cylinder—see 113, 143-145, 113A-113D) or (b) the upstream end of the portion of the outlet channel which has a substantially uniform cross sectional area, whichever of (a) and (b) is closer to exit end E. For example, see starting point S, exit end E, and length L in each of FIGS. 3-7.

The length L is preferably at least 5, 10, 20, 30, 40, 50, 70, 100, 200, 300, 400, 500, 600, 700, 800, 900, 1000 or 1250 mm.

As the rotor 108 rotates, the exit end 119, 119A-119E of the outlet channel is covered by the rotor channel 111, 126-128 so that the exit end is open, and then is covered by the internal surface 110 of the rotor 108 so that the exit end is closed. Each rotor channel preferably has a wide enough cross sectional area so that the exit end is completely unblocked, i.e., open, when the rotor channel is centered over the exit end. As used in the claims, the outlet channel (and its exit end) is open when it is completely unblocked, such as when it is covered by a rotor channel as shown in FIGS. 1-2, and the outlet channel (and its exit end) is closed when it is covered by the internal surface 110 (excluding the rotor channels).

Each rotor channel 111, 126-128 is preferably cylindrical (alternatively rectangular or any other shape in cross section) and preferably has a cross sectional area equal to or not more than 1, 2, 3, 5, 7, 9, 10, 15, 20, 30, 40, 50, 70, 90, 100, 150, 200, 300 or 400 percent greater than the cross sectional area of each exit end 119, 119A-119E.

The rotor preferably rotates at at least 500, 700, 900, 1000, 1500, 2000, 2500, 3000, 3500, 4000, 5000, 6000, 7500 or 10,000 RPM. The faster the rotor rotates, the shorter is the time period that it takes an exit end to go from open to closed.

The amount of time that it takes to close the outlet channel is calculated using the equation $t \geq 2L/c$, where t is the time period in seconds that it takes to close the outlet channel, that is, to go from open to closed. L is the length of the outlet channel in meters, and c is the speed of sound in the liquid in meters per second.

The time period (t) that it takes to close the outlet channel, for example, to close the exit end of the outlet channel, that is, to go from open to closed, is preferably less than 0.0000068, 0.000027, 0.000067, 0.00013, 0.00067, 0.001, 0.0013, 0.002 or 0.01 seconds.

The local constriction 113, 14, 143-145, 113A-113D is preferably cylindrical with a diameter of at least 0.1, 0.3, 05, 1, 5, 10, 15, 20, 30, 40, 50 or 60 mm or more, preferably 0.1-60 mm or more, and preferably has across sectional area (whether cylindrical or not) corresponding to at least the cross sectional areas of these cylindrical diameters.

The outlet channel 114, 153-155, 114A-114E is preferably cylindrical and preferably has a diameter and a cross sectional area (whether cylindrical or not) which is at least 1, 2, 4, 5, 10, 20, 30, 50, 75, 100, 200, 300, 400, 500 or 600, percent (or more) bigger than the local constriction to which it is connected.

The velocity of the liquid within the length L of the outlet channel and at the exit end of the outlet channel, when the exit end is open, is preferably at least 1.4, 2, 3, 4, 5, 6, 7, 8, 9, 10, 20, 30, 40, 50, 60, 70, 80, 90, 100, 150, 200, 300, 400, 500 or 600 m/sec or more.

The velocity of the flow of liquid in the local constriction is high enough to create at least one liquid jet containing cavitation bubbles beyond the local constriction in the outlet channel.

Housing 101 has an outlet port 115 to allow the exhaust or exit of liquid which has been processed. Shaft 109 is connected to a motor (not shown) to rotate the rotor 108.

In operation, pump 121 pumps liquid under pressure through or via inlet port 112 into chamber 118 and the liquid then flows through passageways 122-125, i.e., into chamber channels or inlet channels 107, 133, 134, 135. As the liquid stream passes the local constrictions 113, 143, 144,145, the static pressure applied by the pump 121 to the liquid forces a jet of liquid through each local constriction 113, 143, 144, 145 and generates a liquid jet containing cavitation bubbles. When the exit end of the outlet channel is in an open position, the pressure is sufficient so that liquid being processed, containing cavitation bubbles, flows in the outlet channel and at the exit end with a velocity of at least 1.4 m/sec.

As the rotor 108 rotates and takes the exit end of the outlet channel from an open position to a closed position, the sudden blockage of flowing liquid through the outlet channel creates a sudden change in liquid velocity and the kinetic energy is converted to pressure energy, in other words a water hammer hydraulic pulse pressure is produced upstream of the exit end 119, as the rotor 108 acts as a rotational dynamic valve. This pulse is propagated upstream at the velocity of sound from the point of origin against the original flow direction and reflected at the point of local constriction 113, 143, 144, 145. Rotor 108, with channel element 105, is an example of a rotational dynamic valve.

This pressure pulse or surge is particularly effective when:

$$t \le \frac{2L}{c} \text{ (discussed above)} \quad [3]$$

The amount of the pulse pressure increase upstream of a fast-acting valve can be approximated using the classic Joukowski equation:

$$P_A = \rho c v, \quad [4]$$

where $P_A$ is the magnitude of the water hammer hydraulic pulse pressure (Pa), $\rho$ is the density of the liquid (kgm$^{-3}$), v is the initial velocity of the liquid in the channel before closing (m/s).

From the Joukowski equation, it is clear that the larger the initial velocity of the liquid in the channel before closing and the larger the speed of sound in the liquid, the greater the magnitude of the hydraulic pulse pressure.

To maximize the hydraulic pulse pressure $P_A$, the leakage through the gap 116 between the internal surface 110 of rotor 108 and the external surface 106 of channel element 105 should be minimized.

This water hammer hydraulic pulse pressure $P_A$ can be several orders of magnitude higher than the static pressure in the fluid. Elevated hydraulic pulse pressure $P_A$ propagates through the outlet channel 114, 153, 154, 155 and collapses the cavitation bubbles. Elevated hydraulic pulse pressures $P_A$, are generally beneficial for the generation an ultra-high controlled pressure shockwaves and temperature conditions in liquids from the collapse of cavitation bubbles.

Shockwaves produced from a cavitation bubble collapse based on the Brennan equation [1] above will be:

$$P_p = 100 R\, P_A/r, \quad [5]$$

where R is the maximum bubble radius, r is the distance from the bubble, and $P_A$ is the external hydraulic pulse pressure which initiated cavitation bubble collapse.

The maximum temperature inside an adiabatically collapsing bubble will be:

$$T_{max} = T_0 \left(\frac{P\Delta}{P_v}\right)^{(\gamma-1)/\gamma}, \quad [6]$$

where $T_0$ is the liquid temperature, $P_A$ the external hydraulic pulse pressure which initiated cavitation bubble collapse, $\gamma$ is the ratio of specific heats of gas or vapor inside the cavitation bubble before collapse, indicating how much heat is released from the gas during the adiabatic compression, and $P_v$ is the gas or vapor pressure inside the cavitation bubble before collapse.

These conditions allow the utilization of more effective hydrodynamic cavitation regimes for conducting sonochemical reactions and processes.

The processing liquids which can be used in the present invention include water, aqueous liquids, organic liquids and mixtures thereof. The organic liquids can be low, medium and high molecular weight liquids, such as monomers, polymers, oligomers, plant oils, fats, resins and mixtures thereof. The processing liquids can be any liquids which are presently used in the art of hydrodynamic cavitation.

The liquids can be comprised of a mixture of two or more liquids such as one liquid soluble in or miscible with another liquid as well as mutually insoluble or immiscible liquids, for example, in the form of emulsions. Furthermore, the liquids used in the invention can carry solid or semisolid particles or mixtures thereof. For example, the liquid can carry particles which act as a reactant, a filler or a catalyst. Mixtures of different particles can be carried by the liquid. The liquid can also carry a gaseous component, such as air, oxygen, nitrogen or carbon dioxide.

In order to promote a further understanding of the invention, the following examples are provided. These examples are shown by way of illustration and not limitation.

Example 1

A water stream with a flow rate of 3.96 gpm (gallons per minute) was passed from a chamber channel (Ø15 mm) through a local constriction (Ø3.5 mm orifice) into an outlet channel (Ø15 mm, length L=85 mm) with a velocity of at least 1.42 m/sec at the exit end from the outlet channel. Beyond the local constriction and in the outlet channel, a liquid jet containing cavitation bubbles with average diameter 0.12 mm localized was formed at the distance of 15 mm from the local constriction under static pressure $P_{st}$=50 psi. The cavitation bubbles primarily included air with presumably a pressure $P_v$=0.33 psi and a ratio of specific heats of air $\gamma$=1.401 for water temperature 22.2° C. and density p=997.8 kgm$^{-3}$.

a) Compression cavitation bubble under static pressure $P_{st}$. Driven by static pressure $P_{st}$=50 psi, the cavitation bubbles with diameter 0.12 mm, based on the Brennan equation [1] above, can generate on the distance r=5 mm a shockwave pressure $P_p$=60 psi. Maximum temperature inside adiabatically collapsing bubble based on equation [2] above will be $T_{max}$=968.4° C.

b) Compression cavitation bubble water hammer hydraulic pulse pressure $P_A$.

The water (c=1482 m/s) stream moving at 1.42 m/sec in the outlet channel, and once brought to an abrupt stop in a fast closing valve in a time of less than 0.00012 second, according to equation [4] above the water hammer will result in a pulse pressure $P_A$=304.5 psi.

Driven by the water hammer hydraulic pulse pressure $P_A$=304.5 psi, the cavitation bubbles with diameter 0.12 mm, based on the Brennan equation [1] above, can generate on the distance r=5 mm a shockwave pressure Pp=365.4 psi. The maximum temperature inside adiabatically collapsing bubbles based on equation [2] above will be $T_{max}$=1808.2° C.

Example 2

A water stream with a flow rate of 3.96 gpm was passed from a chamber channel (Ø15 mm) through a local constriction (Ø3.5 mm orifice) into an outlet channel (Ø15 mm, length L=85 mm) at a velocity of at least 1.42 m/sec at the exit end from the outlet channel. Beyond the local constriction and in the outlet channel, a liquid jet containing cavitation bubbles with average diameter 0.30 mm localized was formed at the distance 30 mm from the local constriction under a static pressure $P_{st}$=10 psi. The cavitation bubbles primarily included air with presumably a pressure $P_v$=0.33 psi and a ratio of specific heats of air $\gamma$=1.401 for water temperature 22.2° C. and density p=997.8 kgm$^{-3}$.

a) Compression Cavitation Bubble Under Static Pressure $P_{st}$.

Driven by static pressure $P_{st}$=10 psi, cavitation bubbles with diameter 0.30 mm, based on the Brennan equation [1] above, can generate on the distance r=5 mm a shockwave pressure $P_p$=30 psi. Maximum temperature inside adiabatically collapsing bubble based on equation [2] above will be $T_{max}$=510.4° C.

b) Compression Cavitation Bubble Water Hammer Hydraulic Pulse Pressure $P_A$.

The water (c=1482 m/s) stream moving at 1.42 m/sec in the outlet channel, and once brought to an abrupt stop in a fast closing valve in a time of less than 0.00012 second, according to quotation [4] above the water hammer will result in a pulse pressure $P_A$=304.5 psi.

Driven by the water hammer hydraulic pulse pressure $P_A$=304.5 psi, the cavitation bubbles with diameter 0.30 mm, based on the Brennan equation [1] above, can generate on the distance r=5 mm a shockwave pressure $P_p$=913.5 psi. The maximum temperature inside adiabatically collapsing bubbles based on equation [2] above will be $T_{max}$=1808.2° C.

Example 3

A water stream with a flow rate of 12.8 gpm was passed from a chamber channel (Ø15 mm) through a local constriction (Ø3.5 mm orifice) into an outlet channel (Ø15 mm, length L=85 mm) at a velocity of at least 4.57 m/sec at the exit end from the outlet channel. Beyond the local constriction and in the outlet channel, a liquid jet containing cavitation bubbles with average diameter 0.18 mm localized was formed at the distance 40 mm from the local constriction under a static pressure $P_{st}$=200 psi. The cavitation bubbles primarily included air with presumably a pressure $P_v$=0.33 psi and a ratio of specific heats of air γ=1.401 for water temperature 22.2° C. and density ρ=997.8 kgm$^{-3}$.

a) Compression Cavitation Bubble Under Static Pressure $P_{st}$.

Driven by static pressure $P_m$=200 psi, cavitation bubbles with diameter 0.18 mm, based on the Brennan equation [1] above, an generate on the distance r=5 mm a shockwave pressure $P_p$=360 psi. Maximum temperature inside adiabatically collapsing bubble based on equation [2] above will be $T_{max}$=1572.5° C.

b) Compression Cavitation Bubble Water Hammer Hydraulic Pulse Pressure P.

The water (c=1482 m/s) stream moving at 4.57 m/sec in the outlet channel, and once brought to an abrupt stop in a fast closing valve in a time of less than 0.00012 second, according to equation [4] above the water hammer will result in a pulse pressure $P_A$=979.7 psi.

Driven by the water hammer hydraulic pulse pressure $P_A$=979.7 psi, the cavitation bubbles with diameter 0.18 mm, based on the Brennan equation [1] above, can generate on the distance r=5 mm a shockwave pressure $P_p$=1763.5 psi. The maximum temperature inside adiabatically collapsing bubbles based on equation [2] above will be $T_{max}$=2634.2° C.

Thus, utilization of the hydraulic pulse pressure in the liquid flow for compression of the cavitation bubbles is an effective method that leads to a high intensity of sonochemical reactions and an increase in the degree of heating of the medium. The methods described herein can increase the rate of chemical reactions, cause reactions to occur under less restrictive conditions, reduce the number of steps required in a reaction or reaction chain, and enhance catalyst efficiency or initiate of reduction at carbon-carbon bonds.

The present invention can be used with respect to the following sonochemical reactions: preparation of high purity, narrow size distribution nanoparticles and emulsions with uniform shapes; improvement of the performance of phase transfer catalysts and the reactivity of catalysts or reagents; degassing of the liquids and hydrolysis non hydratable phospholipids in oil, promote conversion of dissolved calcium and bicarbonate ions into calcium carbonate and microbial cell disruption, treatment of various bio-fuels, increases both yield and temperature, producing a filled resin electrically and thermally conductive materials.

More specifically, the present invention relates to a reaction and processes method which are effective and useful in the fields of chemistry, electronic materials, biochemistry, agriculture, medication, and pharmaceutical industry.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims. It will be apparent to those skilled in the art that many modifications, variations, substitutions, and equivalents for the features described above may be effected without departing from the spirit and scope of the invention as defined in the claims to be embraced thereby. A preferred embodiment has been described, herein. It will be further apparent to those skilled in the art that the above methods may incorporate changes and modifications without departing from the general scope of this invention. It is intended to include all such modifications and alterations in so far as they come within the scope of the appended claims.

What is claimed is:

1. A method of processing a liquid comprising the steps of:
    (a) passing a flow of the liquid from an inlet channel through at least one local constriction and into an outlet channel, the flow of liquid having a velocity of at least 1.4 m/s at the exit end of the outlet channel;
    (b) creating at least one liquid jet containing cavitation bubbles beyond the local constriction in the outlet channel; and
    (c) collapsing the cavitation bubbles by subjecting the cavitation bubbles to a water hammer hydraulic pulse pressure, said water hammer hydraulic pulse pressure resulting from periodically closing the outlet channel, each said closing of the outlet channel occurring within a time period calculated using the equation $$t \le \frac{2L}{c},$$

where t is the time period in seconds that it takes to close the outlet channel, L is the length of the outlet channel in meters, and c is the speed of sound in said liquid in meters per second.

2. The method according to claim 1, wherein the closing of the outlet channel is performed by a rotational dynamic valve.

3. The method of claim 1, wherein the liquid is selected from the group consisting of aqueous liquids, organic liquids, and mixtures thereof.

4. The method of claim 3, wherein the liquid comprises two liquids which are immiscible with each other.

5. The method of claim 1, wherein the liquid is carrying solid or semisolid particles or mixtures thereof.

6. The method of claim 1, wherein the liquid is carrying a gaseous component.

7. The method of claim 1, wherein the local constriction is at least one orifice, nozzle or aperture.

8. The method of claim 1, wherein, in step (a), said velocity is at least 2 m/s.

9. The method of claim 1, wherein the closing of the outlet channel occurs at an exit end of the outlet channel.

10. A device for processing a liquid comprising a housing, a channel element and a rotor, the channel element being mounted in the housing, the channel element having a cylindrical external surface, a longitudinal axis and a plurality of passageways, each passageway extending radially along a line which (a) originates at a point on the longitudinal axis and (b) extends perpendicular to the longitudinal axis, each passageway comprising a local constriction and an outlet channel, the rotor being mounted on a shaft and being located within the housing, the rotor having a cylindrical internal surface facing the channel element cylindrical external surface, the rotor having a plurality of radially-extending rotor channels, the rotor being rotatable about the channel element such that, as the rotor rotates, each rotor channel will periodically line up with each outlet channel so that the outlet channel is open.

11. The device of claim 10, wherein the rotor is rotatable about the channel element such that, as the rotor rotates, each outlet channel is periodically closed by being covered by the internal surface of the rotor.

12. The device of claim 10, wherein the device has an inlet port in fluid communication with each passageway.

13. The device of claim 10, wherein the housing has an outlet port for allowing the exhaust of liquid which has been processed.

14. The device of claim 10, wherein the outlet channels and the rotor channels have a circular or rectangular cross section.

15. The device of claim 10, wherein each local constriction is at least one orifice, nozzle or aperture.

16. The device of claim 10, wherein each outlet channel has an exit end and wherein the cross sectional area of the exit end of each outlet channel and the cross sectional area of each rotor channel are the same.

\* \* \* \* \*

UNITED STATES PATENT AND TRADEMARK OFFICE
CERTIFICATE OF CORRECTION

PATENT NO. : 10,065,167 B2
APPLICATION NO. : 15/200874
DATED : September 4, 2018
INVENTOR(S) : Oleg Kozyuk Page 1 of 1

It is certified that error appears in the above-identified patent and that said Letters Patent is hereby corrected as shown below:

In the Specification

Column 6, Line 5, should be:
$t \leq \frac{2L}{c}$, where t is the time

Column 9, Line 32, should be:
Driven by static pressure $P_{st}$=200 psi,

Column 9, Line 39, should be:
hammer hydraulic pulse pressure $P_\Delta$.

Column 9, Line 44, should be:
result in a pulse pressure $P_\Delta = 979.7$ psi.

Signed and Sealed this
Seventh Day of May, 2019

Andrei Iancu
*Director of the United States Patent and Trademark Office*